(12) United States Patent
Mukai et al.

(10) Patent No.: US 7,592,723 B2
(45) Date of Patent: Sep. 22, 2009

(54) VEHICULAR ELECTRIC ROTARY MACHINE

(75) Inventors: Takuzou Mukai, Handa (JP); Shin Kusase, Oobu (JP)

(73) Assignee: Denso Corporation, Kariya (JP)

( * ) Notice: Subject to any disclaimer, the term of this patent is extended or adjusted under 35 U.S.C. 154(b) by 368 days.

(21) Appl. No.: 11/448,689

(22) Filed: Jun. 8, 2006

(65) Prior Publication Data

US 2006/0279144 A1    Dec. 14, 2006

(30) Foreign Application Priority Data

Jun. 13, 2005    (JP)    ............................... 2005-172331

(51) Int. Cl.
*H02K 9/22* (2006.01)
*H02K 9/06* (2006.01)
*H02K 19/16* (2006.01)

(52) U.S. Cl. ........................... 310/68 D; 310/52; 310/64

(58) Field of Classification Search ................... 310/52, 310/64, 68 D, 238–239

See application file for complete search history.

(56) References Cited

U.S. PATENT DOCUMENTS

| 4,012,770 | A | * | 3/1977 | Pravda et al. ................ 257/715 |
| 4,295,067 | A | * | 10/1981 | Binder et al. .................. 310/52 |
| 4,739,204 | A | * | 4/1988 | Kitamura et al. .......... 310/68 D |
| 6,184,602 | B1 | * | 2/2001 | Ooiwa et al. .............. 310/68 D |
| 7,047,639 | B1 | * | 5/2006 | Sheen .................... 29/890.032 |
| 7,378,766 | B2 | * | 5/2008 | Vasilescu et al. .............. 310/58 |

FOREIGN PATENT DOCUMENTS

JP    A 07-170695    7/1995

* cited by examiner

*Primary Examiner*—Burton Mullins
(74) *Attorney, Agent, or Firm*—Oliff & Berridge, PLC

(57) ABSTRACT

A vehicular electric rotary machine of a heat pipe cooling type is disclosed including heat pipe means 14, 14A, 15, 15B, associated with a cooling fin 51, 52 and a rear end wall 122 of a rear frame 12, which have regions exposed to an exhaust passage 19 to be cooled by a cooling wind Wa for thereby radiating heat of a rectifier.

14 Claims, 8 Drawing Sheets

VEHICULAR ELECTRIC ROTARY MACHINE

CROSS REFERENCE TO RELATED APPLICATIONS

This application is related to Japanese Patent Application No. 2005-172331 filed on Jun. 13, 2005, the content of which is hereby incorporated by reference.

BACKGROUND OF THE INVENTION

1. Field of the invention

The present invention relates to vehicular electric machines each equipped with a rectifier and, more particularly, a vehicular electric rotary machine of a heat pipe cooling type for cooling a rectifier using a heat pipe.

2. Description of the Related Art

In the related art, it has been a common practice for a rectifier of a vehicular alternator to be integrally incorporated into the alternator having an armature winding and a field winding. Such an all-in-one vehicular alternator with the rectifier of the related art is described below.

The rectifier usually includes a positive-electrode heat radiation fin doubling as a positive-electrode output terminal, three-phase diodes (rectifying elements) fixedly secured onto the positive-electrode heat radiation fin on an upper arm side, and diodes (rectifying elements) fixedly secured onto the negative-electrode heat radiation fin on an upper arm side and forming a full-wave rectifying circuit together with the diodes on the upper arm side. In general, the positive-electrode heat radiation fin is usually formed on a rear end wall of an alternator housing (on a side opposite to a pulley) in a substantially radial direction and the negative-electrode heat radiation fin is placed in a position parallel to the positive-electrode heat radiation fin or in an overlapped status. The diode usually includes a metallic outer periphery processed in knurling and the heat radiation fin has a diode insertion through-bore. The alternator includes a centrifugal fan fixedly secured to a rotor of the alternator for creating a cooling wind that is drawn from intake passages formed at a rear end wall of the alternator housing into the alternator housing, that is, into a frame while contacting the positive-side rectifiers and negative electrode rectifiers. Then, upon cooling the inside of the alternator housing, the cooling wind is exhausted from exhaust passages formed on an outer circumferential periphery of the alternator housing.

With the vehicular alternator of such a kind, a strong need arises for the alternator to provide an increased power output. As a result, a related art has a structure to allow the rectifier to be cooled with a cooling wind prior to flowing into the alternator housing with the resultant occurrence of a probability in which operating temperatures of the diodes exceed an allowable level.

To address such an issue, a proposal has heretofore been made in the related art to provide a vehicular electric rotary machine of a heat pipe cooling type wherein an external heat radiation mechanism is disposed on a circumferential periphery of the alternator housing at an external radiated area to allow the external heat radiation mechanism to be thermally connected to the frame at an area close proximity to the rectifier for causing a drop in temperatures of the diodes as disclosed in U.S. Pat. No. 4,295,067.

Further, another proposal has been made in the art to provide a vehicular electric rotary machine of a heat pipe cooling type wherein an external heat source such as a radiator is thermally connected to an alternator housing, that is, a frame via a heat pipe for thereby cooling the alternator housing as disclosed in Japanese Patent Provisional Publication No. 7-170695.

However, with the vehicular electric rotary machine of the heat pipe cooling type disclosed in the first related art set forth above, upon absorbing heat developed in the rectifier, fluid in the heat pipe needs to be cooled using an external cooling fin structural body of a large size located outside the alternator housing. Also, the external cooling fin structural body needs to additionally incorporate a ventilation mechanism. This results in a large size in construction and complicated in structure.

Similarly, with the vehicular electric rotary machine of the heat pipe cooling type disclosed in the second related art set forth above, due to a specific structure wherein heat developed in fluid in the heat pipe upon absorbing heat developed in the alternator housing is dissipated using the external heat radiator (radiator in normal practice), the heat pipe inherently has an extremely elongated length with the resultant difficulty in locating the heat pipe within a compact space inside the an engine room. During replacement of an old vehicular alternator with new one or demounting of the vehicular alternator from the engine room for maintenance, the external heat radiation device (radiator) needs to be separated from the heat pipe and, subsequently, the both component parts are assembled again causing troublesome labor work.

SUMMARY OF THE INVENTION

The present invention has been completed with the above view in mind and has an object to provide a vehicular electric rotary machine of a heat pipe cooling type that is effective to cool a rectifier using a heat pipe employing a compact structure in a small size while enabling simplified assembly or disassembly of the device.

To address the above issues, one aspect of the present invention provides a vehicular electric rotary machine comprising a frame having a rear end wall formed with an intake passage and a circumferential wall formed with an exhaust passage, a stator fixedly supported by the frame and having a stator winding adapted to generate an alternating current voltage, and a rotor rotatably supported inside the stator, a cooling fan fixedly secured to the rotor for drawing a cooling wind through the intake passage to an inside of the frame from which the cooling wind is exhausted to an outside through the exhaust passage. A cooling fin is disposed on the rear end wall of the frame and a rectifier is mounted on the cooling fin for rectifying the alternating current voltage. Rectifier cooling heat pipe means has a first region held in closed contact with the cooling fin to form an evaporator and a second region exposed to the cooling wind to form a condenser section.

With such a structure, the rectifier cooling heat pipe means has the first region held in closed contact with the cooling fin to form the evaporator and the second region exposed to the cooling wind to form the condenser section. This enables fluid in the rectifier cooling heat pipe means to absorb heat from the rectifier for evaporation and evaporated gas inside the heat pipe means is condensed due to the cooling wind created by the vehicular electric rotary machine per se. This results in a vehicular electric rotary machine that is more compact in structure than the related art vehicular electric rotary machine of the heat pipe cooling type and small in size with lightweight and is easy to perform repair and inspection.

More specifically, the rectifier causes remarkable heat development in an extremely small space and, because of reasons to protect rectifying elements of the rectifier and ensure a space for wiring components and other component parts, the rectifying elements are hard to be located in a layout with the highest efficiency in cooling effect using the cooling wind in the vehicular electric rotary machine. Even when adopting a cooling fan with a large size, the rectifier cannot be supplied with adequate amount of a cooling wind, causing the rectifying elements to suffer from insufficient cooling effect.

The present invention has been completed with the above issue in mind. Stated another way, the vehicular electric rotary machine per se originally has a cooling function to achieve the cooling of a condenser section of the heat pipe means. Therefore, the present invention contemplates the provision of the vehicular electric rotary machine wherein the heat pipe means has the evaporator section in the vicinity of the rectifying elements and the condenser section exposed to the cooling wind flowing through the vehicular electric rotary machine. Due to the flow of the cooling wind at a high speed, the condenser section of the heat pipe means can be favorably cooled without a need for an external cooling mechanism as required in the related art practice. This provides a capability of using a heat pipe means with a shortened length in terms of a thermally extending length for improved heat transfer capacity of the heat pipe means. In addition, the external cooling mechanism can be dispensed with, achieving the realization of a remarkably downsized structure.

With the vehicular electric rotary machine, the rectifier cooling heat pipe means may include a radially outward region extending along an outer surface of the frame for exposure to the exhaust passage to be cooled by the cooling wind being exhausted from the exhaust passage to the outside.

With such a structure, the provision of the radially outward region of the rectifier cooling heat pipe means placed along the outer surface of the frame for exposure to the exhaust passage enables a highly reliable condenser section to be formed in a compact area near the frame of the electric rotary machine. That is, with the present embodiment, the condenser section of the heat pipe means is exposed to the exhaust passage that is open to a circumferential periphery of the frame for cooling by the cooling wind. The cooling wind flows through the exhaust passage at an area radially outward of the cooling fan, thereby cooling fluid inside the heat pipe means to be favorably cooled. In addition, since the heat pipe means have the region extending along the rear end wall of the frame and the other region extending along the outer surface of the frame and ending at the exhaust passage, the heat pipe means can be effectively cooled even with the frame per se with the resultant further improvement in cooling effect.

With the vehicular electric rotary machine, the condenser section of the rectifier cooling heat pipe means may be disposed in the exhaust passage so as to cross the cooling wind.

With such a structure, the condenser section has an improved cooling effect due to less development of an air boundary layer. Also, the heat pipe means provides a guard net function preventing foreign material from entering to an inside of the frame through the exhaust passage. Moreover, the condenser section of the heat pipe means can be placed in the exhaust passage in a meandering pattern or paralleled shape pattern using plural pieces of heat pipes and a metallic fin can be attached to the condenser section of the heat pipe means in the exhaust passage.

With the vehicular electric rotary machine, the rear end wall of the frame may have a plurality of heat pipe receiving recesses extending in a substantially radial direction, and the heat pipe means comprises a plurality of heat pipes forced into the heat pipe receiving recesses, respectively, to be integrally fixed to the frame.

With such a structure, the rectifier cooling heat pipe means are forced into the heat pipe receiving recessed formed in the rear end wall of the frame to be unitarily fixed thereto. With such a configuration, the heat pipe means can be simply fixed to the frame for detaching capability, while favorably enhancing a heat conductivity between the frame and the heat pipe means.

With the vehicular electric rotary machine, the rectifier cooling heat pipe means may include a region exposed to the intake passage to be cooled by the cooling wind drawn from the intake passage to the inside of the frame.

With such a structure, the rectifier cooling heat pipe means is cooled by the cooling wind drawn from the intake passages into the inside of the frame. That is, with the present embodiment, the rectifier cooling heat pipe means is exposed to the intake passage and cooled by the cooling wind drawn from the intake passages. With the present embodiment, the cooling fan includes a centrifugal-type cooling fan. The intake passage is formed in the frame at an area radially inward of vane portions of the cooling fan and the rectifier is located in an area radially outward of a radially inward portion of the vane portions of the cooling fan. With such a layout, the cooling wind can flow at a relatively high speed in an area near the intake passage, enabling fluid inside the heat pipe means to be effectively cooled. Moreover, the heat pipe means may be arranged to absorb heat from the cooling fin composed of a positive-side radiating fin that needs to be electrically insulated from the frame. This results in simplification of electrical insulation.

With the vehicular electric rotary machine, the condenser section of the rectifier cooling heat pipe means may be disposed in an area close proximity to the intake passage so as to cross the cooling wind.

With such a structure mentioned above, the condenser section of the heat pipe means is located in the area close proximity to the intake passage so as to cross the cooling wind, resulting in improvement in cooling effect. Also, the heat pipe means provides a guard net function preventing foreign material from entering to the inside of the frame through the intake passage. Moreover, the condenser section of the heat pipe means can be placed in the intake passage in a meandering pattern or paralleled shape pattern with plural pieces of heat pipe elements, Further, a metallic fin can be attached to the condenser section of the heat pipe means in the intake passage.

With the vehicular electric rotary machine, the rectifier cooling heat pipe means may include a planar surface portion in close contact with the cooling fin. This enables the heat pipe means to be held in close contact with the cooling fin, enabling a reduction in thermal resistance. Also, an insulation sheet may be preferably disposed between the heat pipe means and the cooling fin.

With the vehicular electric rotary machine, the evaporator section of the rectifier cooling heat pipe means may include a tube through which a coolant fluid flows, and the cooling fin that plays a role as a heat radiation member held in close contact with the cooling fin.

With such a structure, due to a structure of the evaporator section including the heat pipe means with the planar surface portion and the cooling fin with high heat conductivity, heat conductive resistance between the cooling fin and the heat pipe means can be decreased with an increase in a heat conducting efficiency. Thus, the evaporator with high efficiency can be realized merely by placing an insulation sheet between the cooling fin and the heat pipe means.

With the vehicular electric rotary machine, the rectifier cooling heat pipe means may comprise a plurality of heat pipes each including a radially inward region exposed to the intake passage, an intermediate region held in contact with the cooling fin, and a radially outward region extending along an outer surface of the frame for exposure to the exhaust passage to be cooled by the cooling wind being exhausted from the exhaust passage.

With such a structure, the rectifier cooling heat pipe means can be effectively cooled with the cooling wind in a simplified structure due to the provision of the radially inward regions of the heat pipe means so as to be exposed to the intake passage. More particularly, due to the flow of the cooling wind flowing through the intake passage at a high speed, the condenser section of the heat pipe means can be favorably cooled without a need to be cooled in a substantially outside area of the rotary machine as achieved in the related art practice. This provides a capability of using a heat pipe means with a shortened length in terms of a thermally extending length for improved heat transfer capacity of the heat pipe. In addition, the external cooling mechanism can be dispensed with, achieving the realization of a remarkably downsized structure.

With the vehicular electric rotary machine, the rectifier cooling heat pipe means may comprise first and second pluralities of heat pipes held in contact with the rear end wall of the frame and the cooling fin, one of the first and second pluralities of heat pipes including radially inward regions extending across the intake passage to form the condenser section.

With such a structure, the condenser section can be placed in an area close proximity to the intake passage to effectively condense evaporated fluid in the heat pipe means. This enables the heat pipe means to be formed in a shortened length with no need for providing an external heat radiation device. This enables the vehicular electric rotary machine to be formed in a simplified structure at reduced cost.

With the vehicular electric rotary machine, the cooling fins may comprise first and second heat radiating fins mounted on the rear end wall of the frame and the rectifier cooling heat pipe means may comprise a first plurality of heat pipes held in close contact with the rear end wall of the frame and the first heat radiating fins, and a second plurality of heat pipes held in close contact with the second heat radiating fins, the first and second pluralities of heat pipes including radially inward regions exposed to the intake passage so as to cross the cooling wind.

With such a structure set forth above, due to the provision of first and second heat radiating fins held in close contact with the first and second pluralities of heat pipes, respectively, a highly reliable cooling mechanism can be realized in a simplified structure at low cost.

With the vehicular electric rotary machine, the rear end wall of the frame may have a first plurality of heat pipe receiving recesses to which the first pluralities of heat pipes are press fitted, respectively, and the second heat radiating fin may have a second plurality of heat pipe receiving recesses to which the second plurality of heat pipes are press fitted, respectively.

Due to the arrangement between the first and second pluralities of heat pipe receiving recesses and the first and second pluralities of heat pipes press fitted to the first and second pluralities of heat pipe receiving recesses, respectively, the rotary electric machine can have a highly improved cooling mechanism that is simple and compact in construction and low in manufacturing cost. Also, due to the provision of first and second pluralities of the heat pipes means associated with the first and second heat pipe receiving recesses, the electric rotary machine can be assembled in less number of labor hours with the resultant increased cooling efficiency with no need for preparing an external heat radiating mechanism.

With the vehicular electric rotary machine, the first heat radiating fin may have a first plurality of heat pipe receiving recesses to which the first plurality of heat pipes are press fitted, respectively and the second heat radiating fin may have a second plurality of heat pipe receiving recesses to which the second plurality of heat pipes are press fitted, respectively.

Due to the arrangement between the first and second pluralities of heat pipe receiving recesses, formed on the first and second head radiating fins, and the first and second pluralities of heat pipes press fitted to the first and second pluralities of heat pipe receiving recesses, respectively, the rotary electric machine can have a highly improved cooling mechanism that is simple and compact in construction and low in manufacturing cost. Also, due to the provision of first and second pluralities of the heat pipes associated with the first and second heat pipe receiving recesses, the electric rotary machine can be assembled in less number of labor hours with the resultant increased cooling efficiency with no need for preparing an external heat radiating mechanism.

With the vehicular electric rotary machine, the first and second, pluralities of heat pipes are integrally connected to each other via radially inward regions exposed to the intake passage to form the condenser section.

Due to the provision of the first and second pluralities of heat pipes integrally connected to each other via radially inward regions exposed to the intake passage, a highly improved cooling efficiency can be obtained with the resultant reduction on labor hours in assembly. Also, such an arrangement results in a simplified structure of the rotary electric machine. Moreover, a sub assembly of the cooling fin and the heat pipe means can be easily replaced for maintenance at low cost.

With the vehicular electric rotary machine, the first and second pluralities of heat pipes are integrally connected to each other via radially inward regions exposed to the intake passage to form the condenser section.

Due to the provision of the first and second pluralities of heat pipes integrally connected to each other via radially inward regions exposed to the intake passage, a highly improved cooling efficiency can be obtained with the resultant reduction on labor hours in assembly. Also, such an arrangement results in a simplified structure of the rotary electric machine. Moreover, a sub assembly of the cooling fin and the heat pipe means can be easily replaced for maintenance at low cost.

DETAILED DESCRIPTION OF THE PREFERRED EMBODIMENTS

Now, rotary electric machines of various embodiments according to the present invention are described below as applied to vehicular alternators of heat pipe cooling types with reference to the accompanying drawings. Although the present invention is herein described with reference to the vehicular alternator by way of example, it should be appreciated that the present invention is not limited to those of the embodiments described below and a principal concept of the present invention may be realized with other known technologies or combination of technologies equivalent to such known technologies.

First Embodiment

Figure 1:
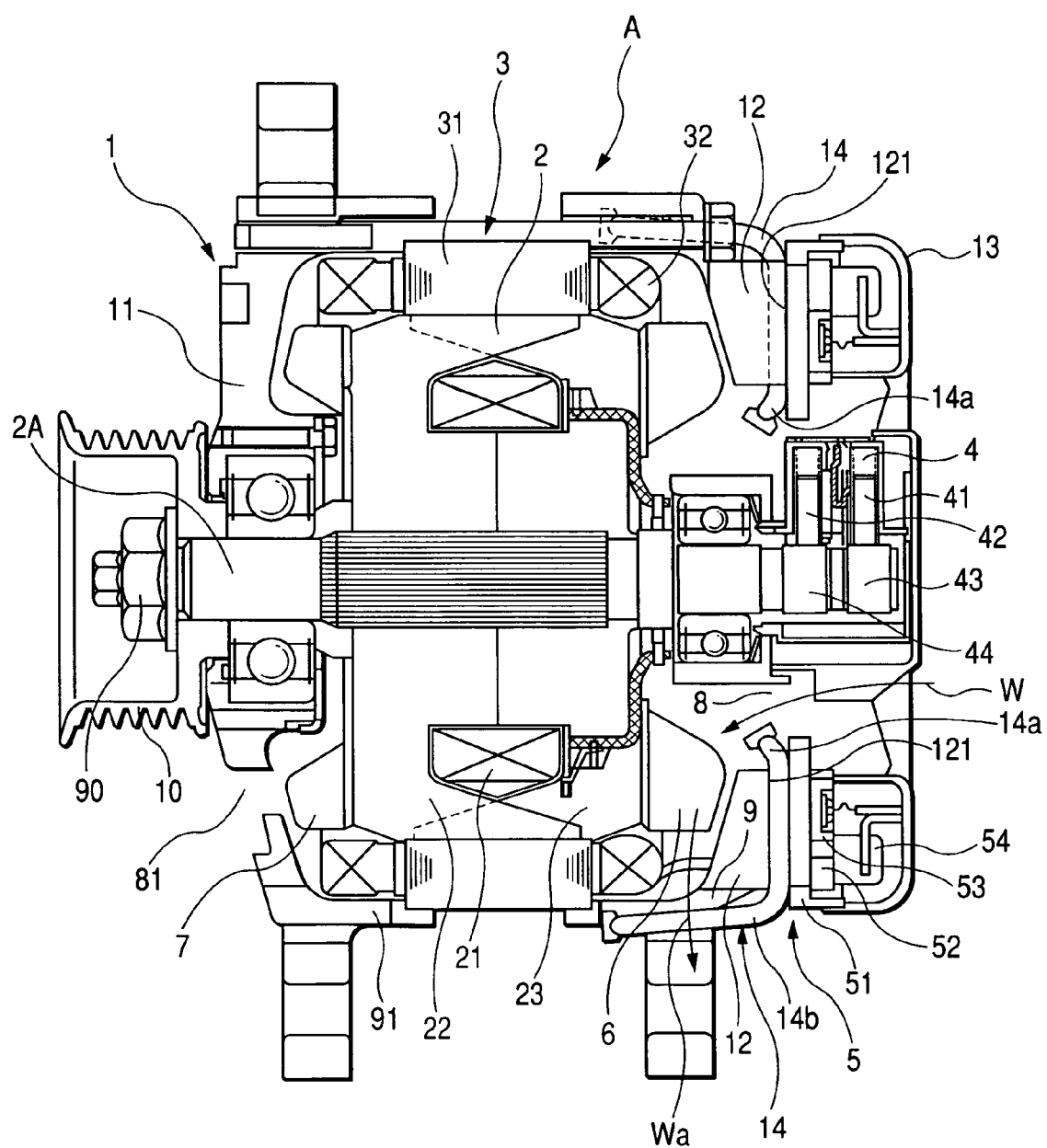
FIG. 1 is a cross-sectional view of a vehicular electric rotary machine of a heat pipe cooling type of a first embodiment according to the present invention.
Figure 2:
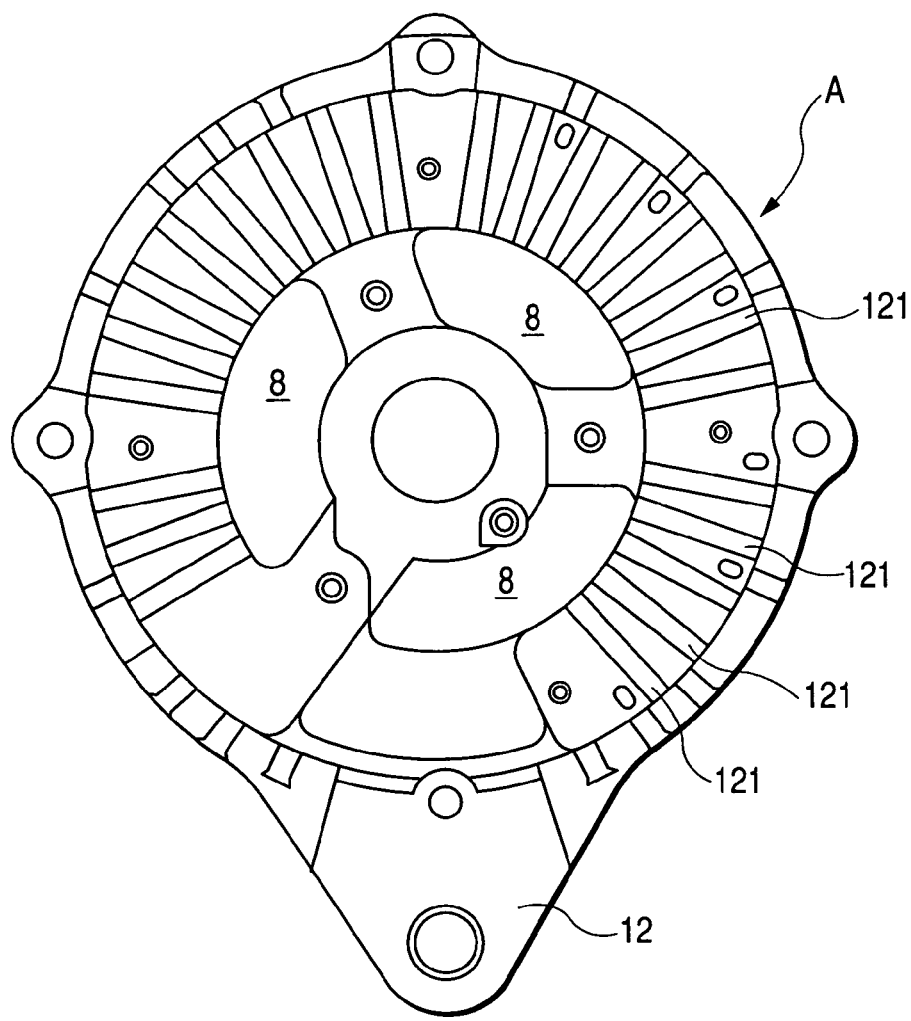
FIG. 2 is a typical front view of a rear frame of the vehicular electric rotary machine of the first embodiment shown in FIG. 1.
Figure 3:
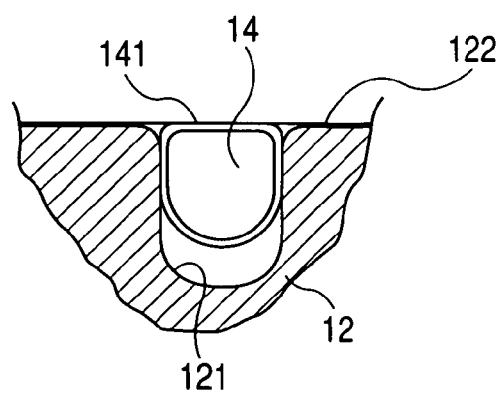
FIG. 3 is an enlarged cross sectional view showing the relationship between a heat pipe receiving recess and a heat pipe.
Figure 4:
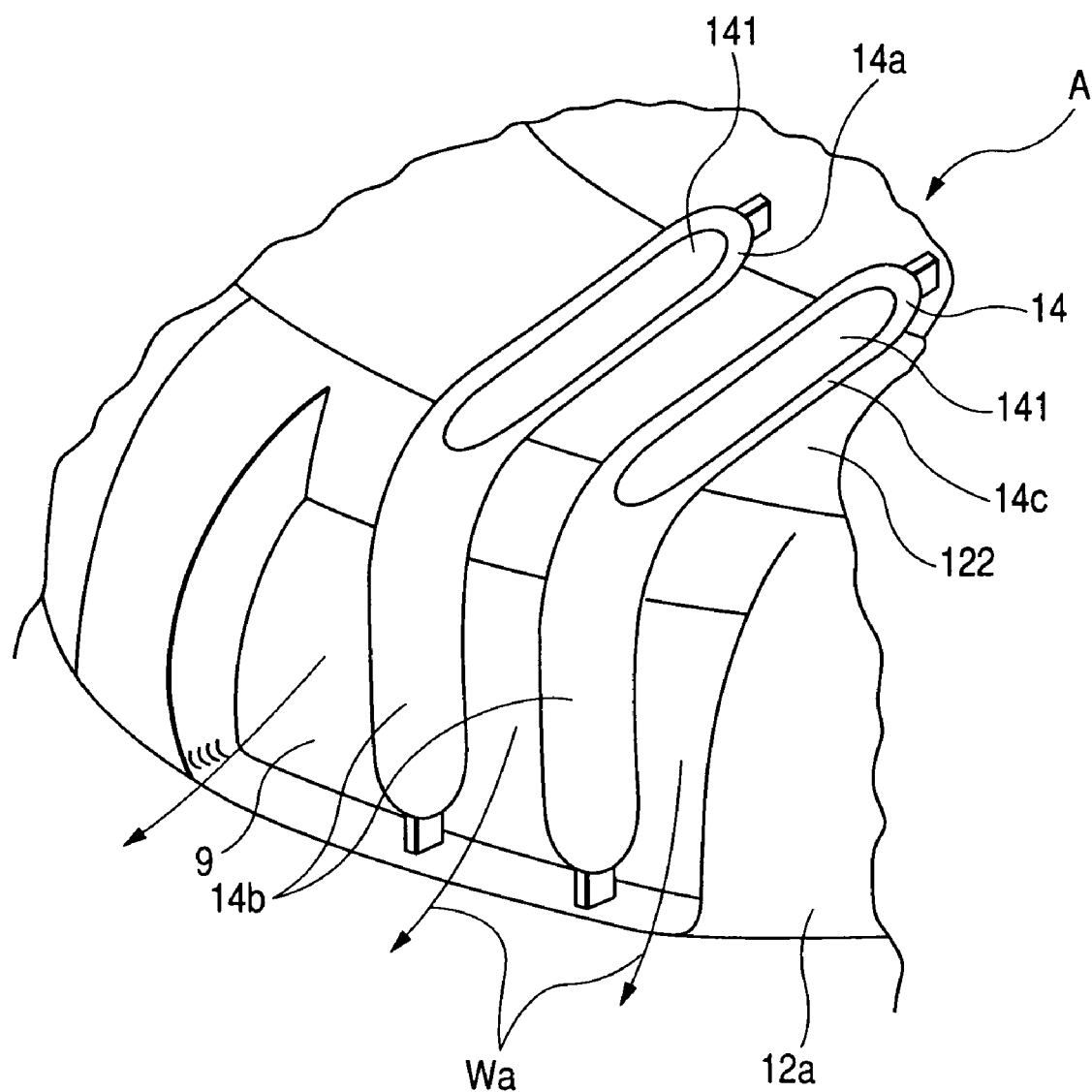
FIG. 4 is a perspective enlarged cutaway view showing a vicinity of the rear end wall of the vehicular electric rotary machine of the first embodiment shown in FIG. 1.

A rotary electric machine of a first embodiment according to the present invention is described with reference to FIGS. 1 to 4. FIG. 1 is a cross-sectional view of a vehicular alternator of a heat pipe cooling type of the first embodiment. FIG. 2 is a front view of a rear frame as viewed from a rear area. FIG. 3 is an enlarged cross-sectional view showing the relationship between a heat pipe receiving recess formed in the rear frame and a heat pipe. FIG. 4 is a perspective view for showing the relationship between exhaust ports formed in the rear frame and heat pipes.

As shown in FIG. 1, the vehicular alternator A is comprised of a frame 1 that includes a front frame 11 and a rear frame 12 axially spaced from each other between which a stator 3 is sandwiched. The front and rear frames 11, 12 are coupled to each other by means of a plurality of stud bolts and associated nuts (not shown) to tightly support the stator core 31. A Randel type rotor 2 is rotatably disposed inside the stator 3 and includes a field winding 21 and a pair of pole cores 23 concentrically disposed on both sides of the field core 21. The stator 3 is comprised of a stator iron core 31 fixedly supported on an inner circumferential wall of the frame 1, and a stator winding 32 wound on the stator core 31. The rear frame 12 has a rear end wall on which a field winding power supply mechanism 4 is mounted for supplying electric power to the field winding 21. The field winding power supply mechanism 4 is comprised of a pair of brushes 41, 42 and a pair of slip rings 43, 44.

Mounted on the rear end wall of the rear frame 12 is a rectifier 5 that includes a negative-side radiating fin 51, mounted on the rear frame 12 via an insulation sheet (not shown), and a positive-side radiating fin 52 stacked on the negative-side radiating fin 51 via an insulation sheet (not shown), a negative-side diode (not shown) (on a lower arm side) press fitted to an aperture of the negative-side radiating fin 51 and a positive-side diode (rectifying element) 53 (on an upper arm side) press fitted to an aperture of the positive-side radiating fin 52, and a terminal block 54. The negative-side radiating fin 51 and the positive-side radiating fin 52 are fixedly coupled to the frame 1, with the radiating fins 51, 52 playing a role as cooling fins for cooling rectifying elements. The negative-side radiating fin 51 is held in close contact with a rear end wall 122 of the rear frame 12. The negative-side radiating fin 51 doubles as a ground electrode of the rectifier 5 and the positive-side radiating fin 52 doubles as a "+" output terminal of the rectifier 5. The negative-side radiating fin 51 and the positive-side radiating fin 52 have surfaces on which three-phase diodes are fixedly mounted, respectively, with respective terminals closer to the alternator being connected to three-phase terminal leads extending from the stator winding 32 at the terminal block 54.

A rear cooling fan is fixedly mounted on a rear end-face of the rotor 2 and a front cooling fan is fixedly mounted on a front end-face of the rotor 2. A plurality of intake passages 8 is formed through the rear end wall 122 of the rear frame 12. The rear frame 12 has a circumferential wall 12a formed in an area radially outward of the cooling fan 6 and a plurality of exhaust passages 9 is formed on the circumferential wall 12a of the rear frame 12. Like the intake passages 8 and the exhaust passages 9, the front frame 11 also has a radial wall formed with plurality of intake passages 81 and a circumferential wall formed with a plurality of exhaust passages 91. The rotor 2 has a rotary shaft 2A having a front end carrying thereon a pulley 10 for unitary rotation with the rotor 2 and the pulley 10 is fixedly coupled to a front distal end of the rotary shaft 2A by a nut 90. The rear end wall 122 of the rear frame 12 is covered with a resin cover 13 that internally accommodates the field winding power supply mechanism 4, the rectifier 5 and a field wiring current controller (regulator). The vehicular rotary electric machine of this type is well known as a vehicular alternator.

(Cooling Mechanism for Rectifier)

Now, an essential feature of the present embodiment is described with reference to FIG. 1. The rear end wall 122 of the rear frame 12 is formed with a plurality of heat pipe receiving recesses 121 extending in a radial direction to which heat pipes 14, playing a role as a heat pipe means, are press fitted to provide satisfactory heat conductivity with the associated recesses 121. The rectifier 5 is coupled to the rear frame 12 by means of screws or stud bolts in close contact with the rear end-face 122 of the rear frame 12 after the heat pipes 14 have been press fitted to the heat pipe receiving recesses 121. However, the heat pipes 14 may be fixedly secured to the negative-side radiating fin 51 of the rectifier 5 in close contact therewith, after which the rectifier 5 is coupled to the rear end-face 122 of the rear frame 12, and the heat pipes 14 may be press into the heat pipe receiving recesses 121 formed on the rear end-face 122 of the rear frame 12.

With the present embodiment, the heat pipe receiving recesses 121 are formed not only on the rear end-face 122 of the rear frame 12 but also on the outer circumferential periphery 12a thereof and ended at the exhaust passages 9. The heat pipes 14 are accommodated in the heat pipe receiving recesses 121, respectively. As best shown in FIGS. 1 and 4, the heat pipes 14 include radially inward regions 14a exposed to the intake passages 8 for cooling with a cooling wind W, radially outward regions 14b exposed to the exhaust passages 9, and intermediate portions 14c formed between the radially inward regions 14a and the radially outward regions 14b, respectively. The intermediate regions 14c extend along the rear end-face 122 of the rear face 12 in a radial direction. Further, the radially outward regions 14b extend in a direction parallel to an axis of the rotary shaft 2A and the heat pipe 14 has one end terminate at a frontal end of the rear frame 12.

With such a structure, the negative-side radiating fin 51 of the rectifier 5 and the heat pipes 14 are thermally held in contact with each other in a favorable fashion.

FIGS. 2 to 4 show shapes of the heat pipes 121 and a placement layout of the heat pipes 121. As apparent from FIG. 3, the heat pipe 14 has a planar surface portion 141 in alignment with the rear end-face 122 of the rear frame 12 and the negative-side radiating fin 51 of the rectifier 5 is coupled to the rear frame 12 in close contact with the rear end-face 122 and the planar surface portion 141.

(Operation)

As the cooling fan 6 rotates together with the rotor 2, the cooling fan 6 creates the cooling wind W that flows from the intake passages 8 into an area inside the frame 1 to cool relevant component parts upon which the cooling wind W is exhausted from the exhaust passages 9 to an outside of the rear frame 12. Moreover, the cooling wind W flows through bores formed in the resin cover 13 and clearances between the resin cover 13 and the rear frame 12 to the inside of the resin cover 13. The cooling wind W flows at a high speed in areas close proximity to the intake passages 8 and the exhaust passages 9. However, as shown in FIG. 1, since the rectifier 5 is located in an area outside the intake passages 8 in a radial direction, the cooling wind W has no effect of directly cooling the rectifier 5 in a satisfactory fashion. With the present embodiment, however, since the heat pipes 14 have the radially outward regions 14b exposed to the exhaust passages 9, the heat pipes 14 are favorably cooled with a cooling wind Wa flowing through the exhaust passages 9 and, thus, the radially outward regions 14b of the heat pipes 14 play a role as a condenser section. Moreover, a contact area between intermediate regions 14c (that is, the planar surface areas 141) of the heat pipes 14 and the negative-side radiating fin 51 plays a role as an evaporating section that favorably absorb heat from the respective diodes 53.

With the present embodiment, due to a mechanical and thermal coupling structure between the heat pies 14 and the rear frame 12 are achieved by press fitting the heat pipes 14 to the associated heat pipe receiving recesses 121 of the rear frame 12, a heat pipe cooling mechanism can be realized with a reliability in coupling property with less heat resistance while providing an ease of detachability of the heat pipes 14. Further, since the cooling wind Wa flowing through the exhaust passages 9 at the high speed enables the cooling of the radially outward regions 14b of the heat pipes 14 or a cooling member fixed to the heat pipes 14 to be cooled in an efficient fashion, a heat pipe cooling structure can be realized in a minimized and simplified structure at low cost. Moreover, the respective heat pipes 14 can prevent foreign dusts from entering through the exhaust passages 14 to the inside of the frame 1.

Second Embodiment

Figure 5:
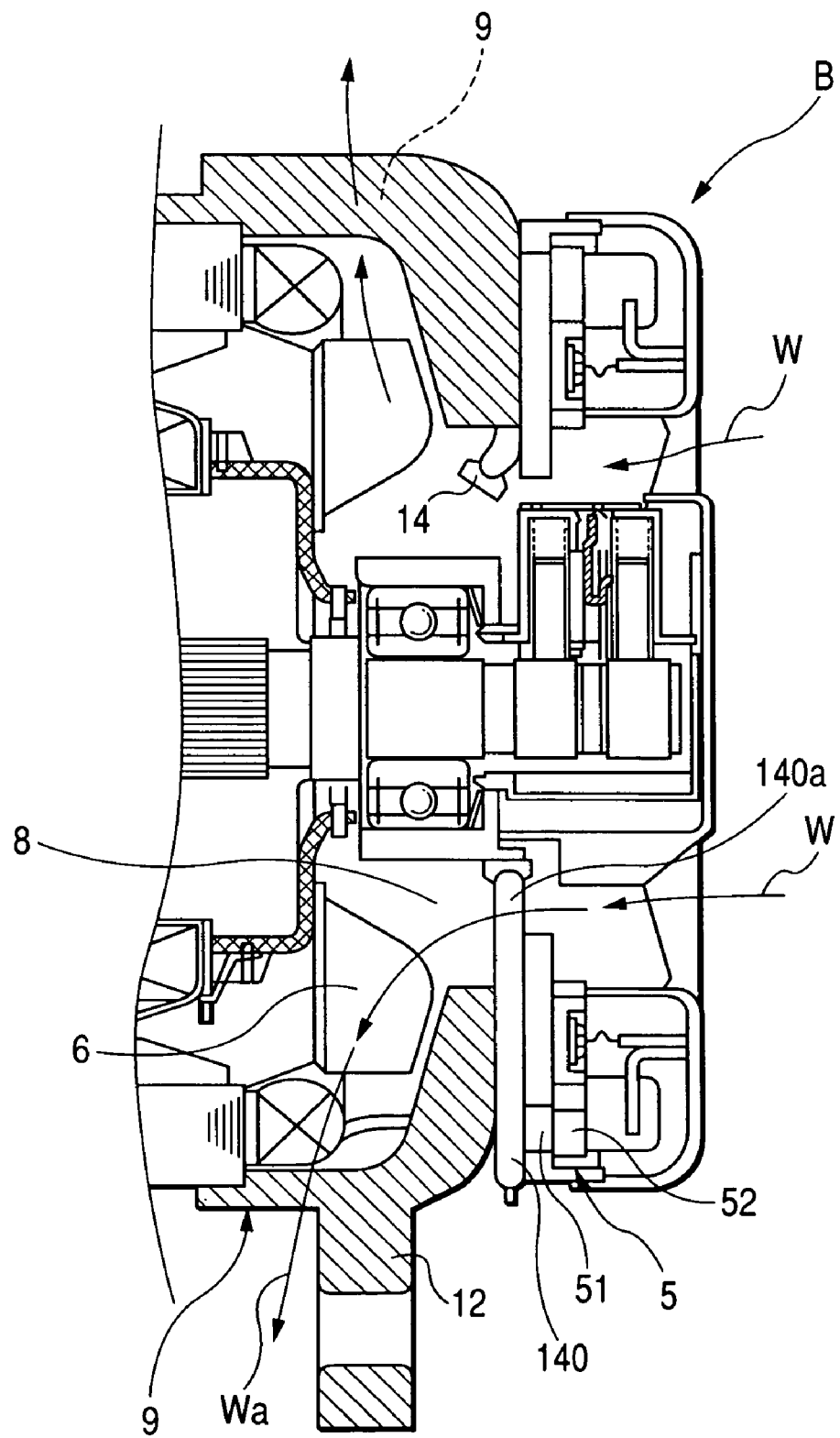
FIG. 5 is a cross-sectional view of a vehicular electric rotary machine of a heat pipe cooling type of a second embodiment according to the present invention.

An electric rotary machine of a second embodiment according to the present invention is described below with reference to FIG. 5. FIG. 5 is a cross-sectional view showing a surrounding area around a rectifier of a vehicular electric rotary machine of a heat pipe cooling type playing a role as the electric machine of the second embodiment.

While the first embodiment has been described with reference to an exemplary structure wherein a large number of heat pipes 14 are radiated in layout, the electric rotary machine B of the second embodiment contemplates that among the large number of heat pipes 14 radiated in layout, some heat pipes 140 have no radially outward regions extending along the exhaust passages 9 but have radially inward regions 140a extending across the intake passages 8. This allows the radially extending regions 140a of the heat pipes 14 to form a condenser section in an area close proximity to the intake passages 8, enabling the provision of effects similar to those of the first embodiment.

Third Embodiment

Figure 6:
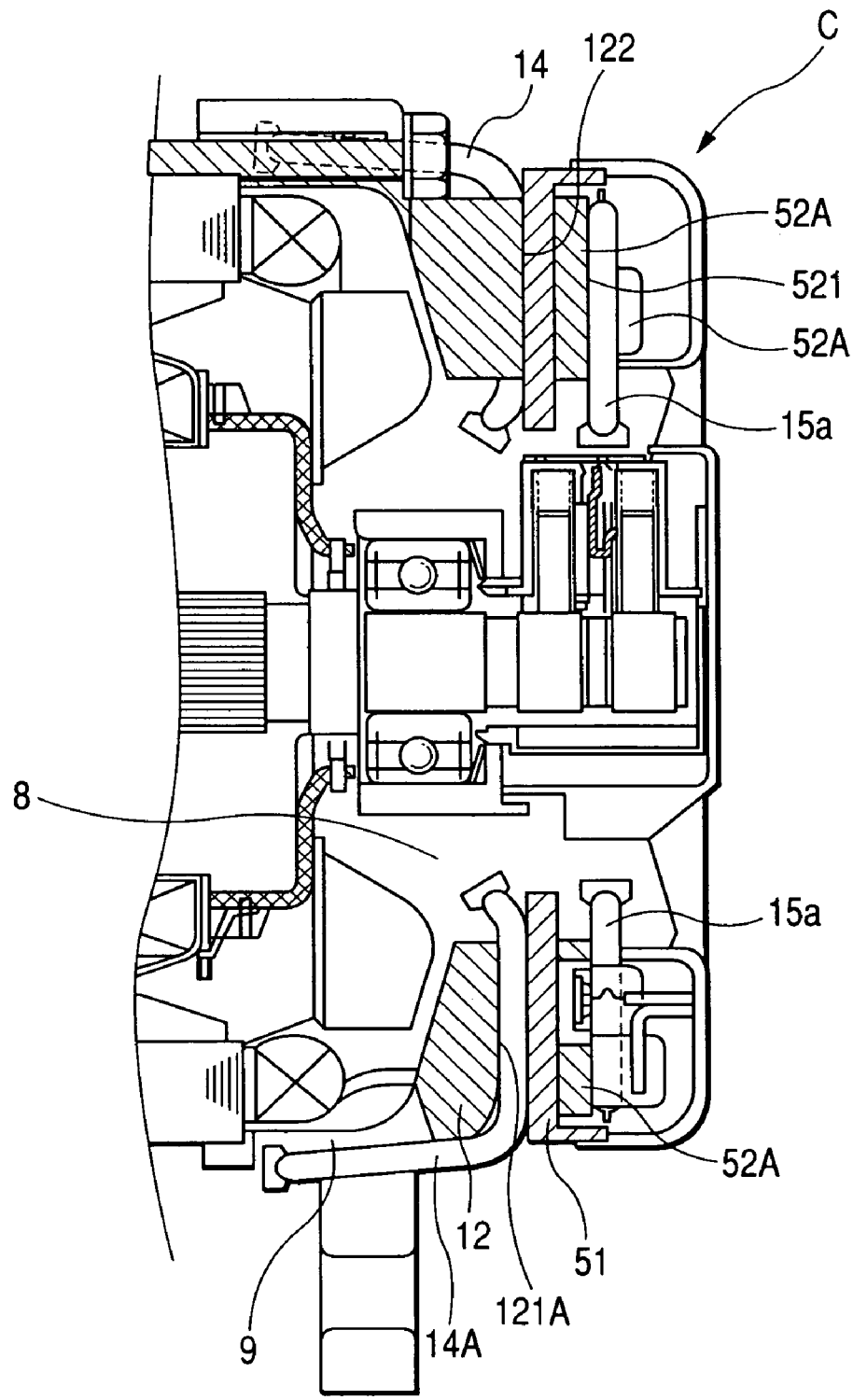
FIG. 6 is a cross-sectional view of a vehicular electric rotary machine of a heat pipe cooling type of a third embodiment according to the present invention.

An electric rotary machine of a third embodiment according to the present invention is described below with reference to FIG. 6. FIG. 6 is a cross-sectional view showing a typical section in the vicinity of a rectifier of a vehicular electric rotary machine of a heat pipe cooling type playing a role as the electric machine of the third embodiment.

With the electric rotary machine C of the third embodiment, the heat pipe means includes first heat pipe means 14A, press fitted to heat pipe receiving recesses 121A formed on the rear end face 122 of the rear frame 12, and second heat pipes 15 press fitted to heat pipe receiving recesses 521 formed on a positive-side radiating fin 52A. The first heat pipes 14A are substantially identical to the heat pipes 14 of the first embodiment shown in FIG. 1 and, hence, the description of the same is herein omitted for the sake of clarity. The second heat pipes 15 have radially inward regions 15a extending across the intake passages 8. This allows the radially extending regions 15a of the heat pipes 15 to form a condenser section in an area close proximity to the intake passages 8, enabling the provision of effects similar to those of the first embodiment. The provision of the first and second pluralities of heat pipes 14A, 15 results in further improvement in a cooling effect of the rectifier 5.

Fourth Embodiment

Figure 7:
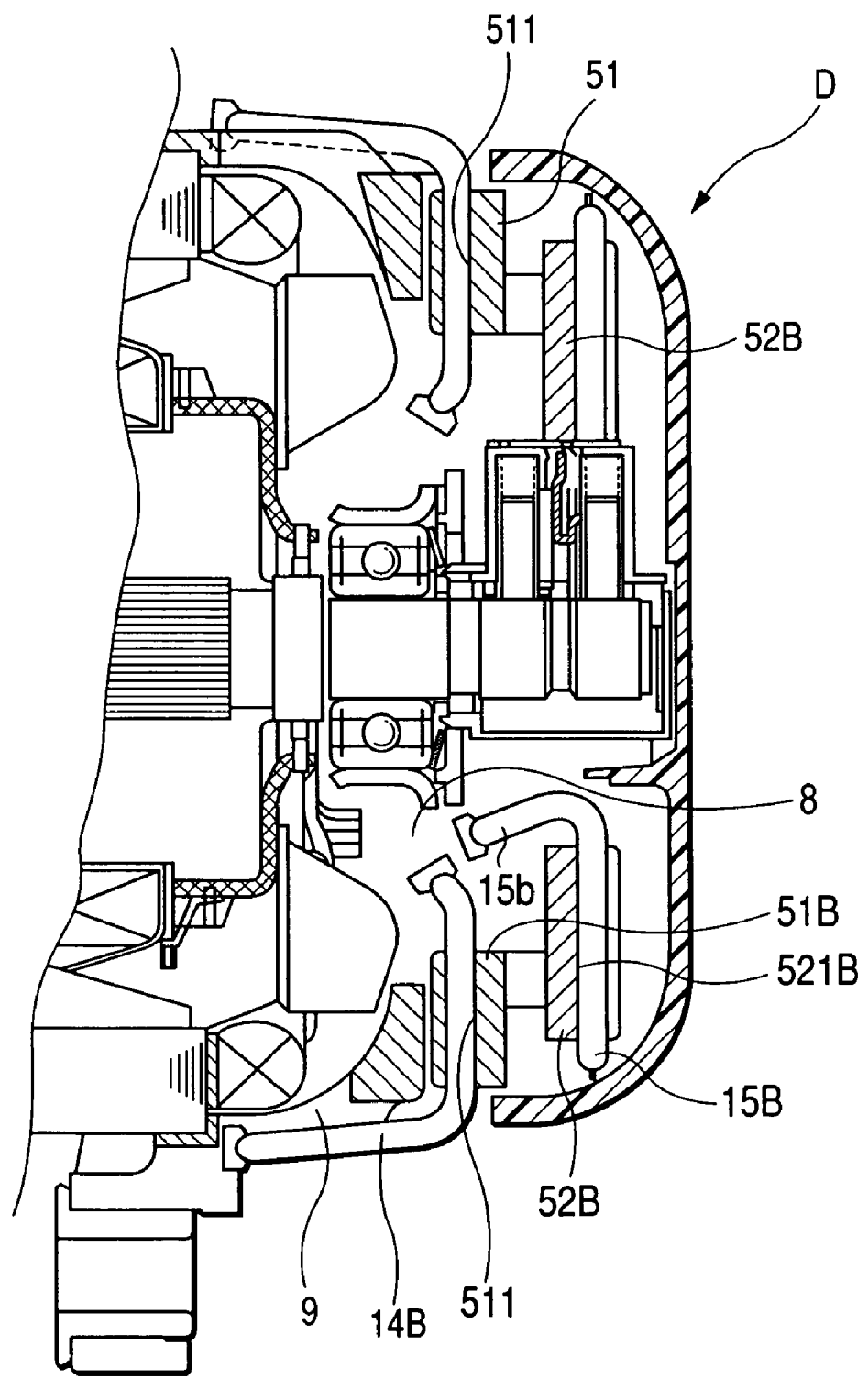
FIG. 7 is a cross-sectional view of a vehicular electric rotary machine of a heat pipe cooling type of a fourth embodiment according to the present invention.

An electric rotary machine of a fourth embodiment according to the present invention is described below with reference to FIG. 7. FIG. 7 is a cross-sectional view showing a surrounding area around a rectifier of a vehicular electric rotary machine of a heat pipe cooling type playing a role as the electric machine of the fourth embodiment.

With the electric rotary machine D of the fourth embodiment, the heat pipe means includes first heat pipe means 14B, press fitted to heat pipe receiving recesses 511 formed on a front surface, facing the rear frame 12, of a negative-side radiating fin 51B, and second heat pipes 15B press fitted to heat pipe receiving recesses 521B formed on a positive-side radiating fin 52B. The first heat pipes 14B are substantially identical to the heat pipes 14 of the first embodiment shown in FIG. 1 and, hence, the description of the same is herein omitted for the sake of clarity. The second heat pipes 15B have radially inward regions 15b extending through the intake passages 8. This allows the radially extending regions 15b of the heat pipes 15B to form a condenser section in an area close proximity to the intake passages 8, enabling the provision of effects similar to those of the first embodiment. The provision of the first and second pluralities of heat pipes 14A, 15 results in further improvement in a cooling effect of the rectifier 5. With the present embodiment, also, the negative-side radiating fin 51B and the positive-side radiating fin 52B are axially spaced from each other with a given distance.

Fifth Embodiment

Figure 8:
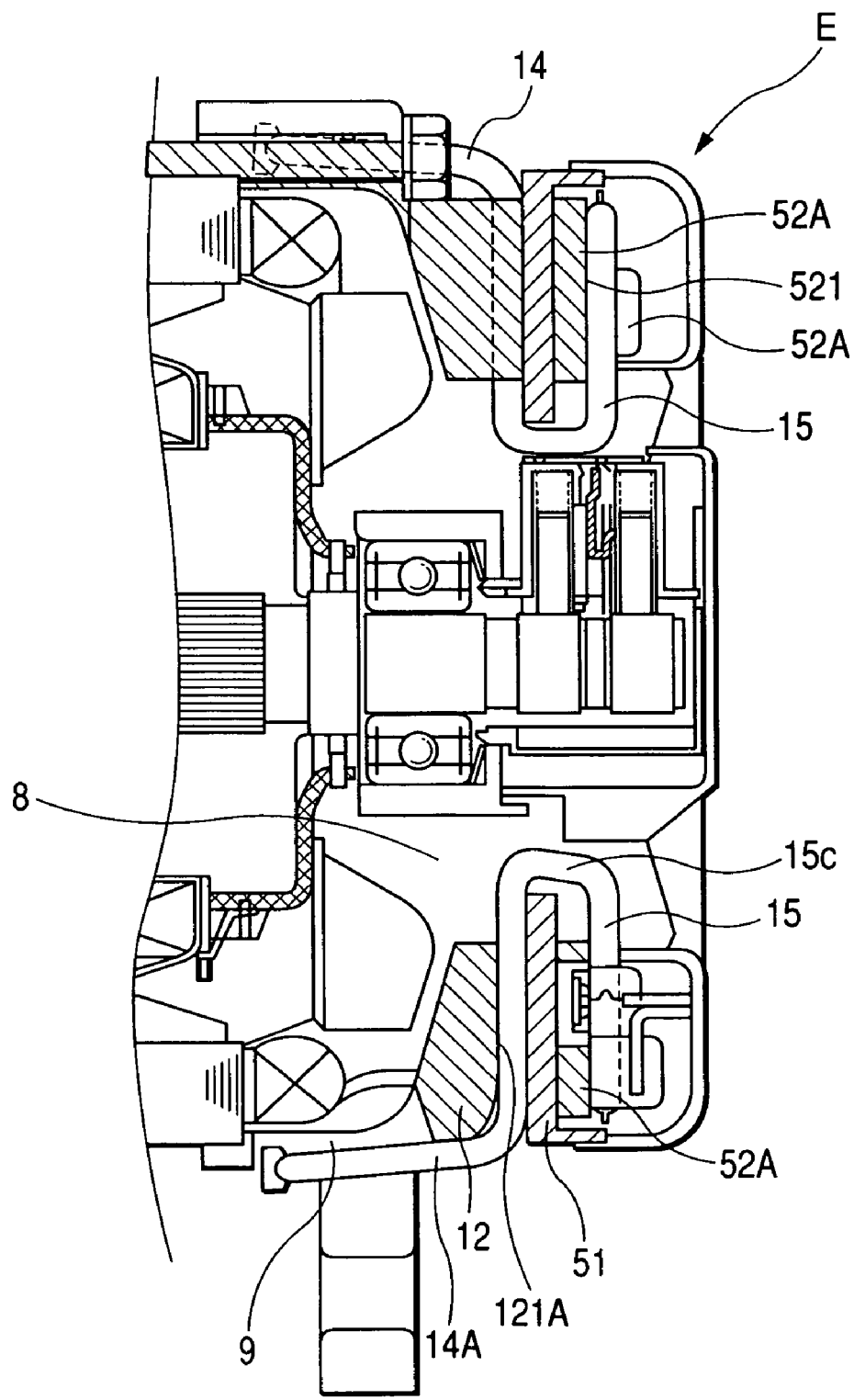
FIG. 8 is a cross-sectional view of a vehicular electric rotary machine of a heat pipe cooling type of a fifth embodiment according to the present invention.

An electric rotary machine of a fifth embodiment according to the present invention is described below with reference to FIG. 8. FIG. 8 is a cross-sectional view showing a typical section in the vicinity of a rectifier of a vehicular electric rotary machine of a heat pipe cooling type playing a role as the electric machine of the fifth embodiment.

The electric rotary machine E of the fifth embodiment differs from the electric rotary machine C of the third embodiment shown in FIG. 6 in that the second heat pipes 15, press fitted to the heat pipe receiving recesses 521 formed on the positive-side radiating fin 52B, are integrally connected to the first heat pipes 14A, press fitted to heat pipe receiving recesses 121A formed in the rear frame 12, through mutual connecting portions 15C, respectively. The mutual connecting portions 15C plays a role as radially inward regions exposed to the intake passages 8 to form a first condenser section. The heat pipes 14A have radially outward regions to form a second condenser section in the same manner as discussed with reference to the first embodiment shown in FIG. 1. An insulation sheet may be preferably disposed between the heat pipe 15 and the positive-side radiating fin 52A.

Sixth Embodiment

Figure 9:
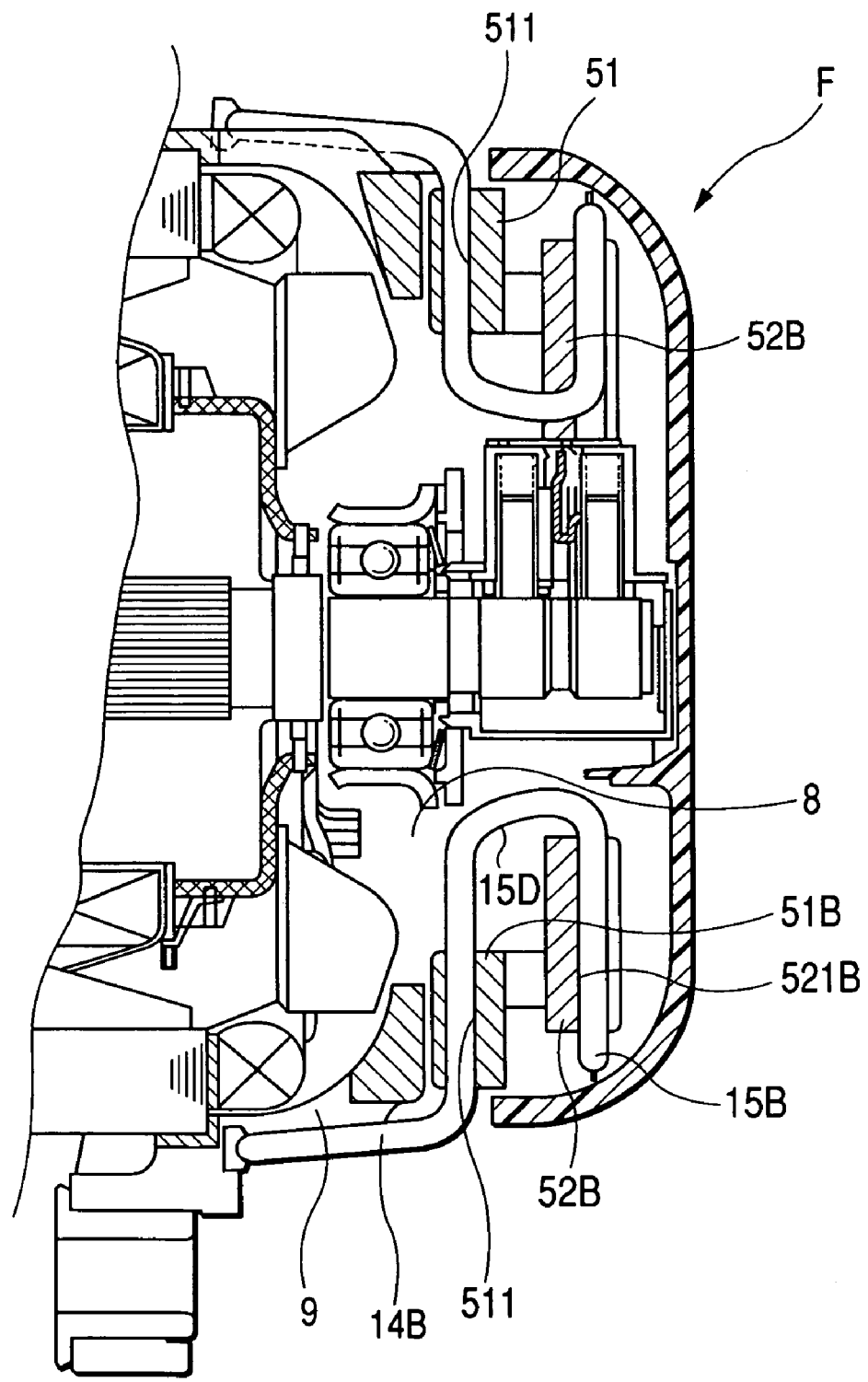
FIG. 9 is a cross-sectional view of a vehicular electric rotary machine of a heat pipe cooling type of a sixth embodiment according to the present invention.

An electric rotary machine of a sixth embodiment according to the present invention is described below with reference to FIG. 9. FIG. 9 is a cross-sectional view showing a typical section in the vicinity of a rectifier of a vehicular electric rotary machine of a heat pipe cooling type playing a role as the electric machine of the sixth embodiment.

The electric rotary machine F of the sixth embodiment differs from the electric rotary machine D of the fourth embodiment shown in FIG. 7 in that the second heat pipes 15B, press fitted to the heat pipe receiving recesses 521B formed on the positive-side radiating fin 52B, are integrally connected to the first heat pipes 14B, press fitted to the heat pipe receiving recesses 511 formed on the negative-side radiating fin 51B, through mutual connecting portions 15D, respectively. The mutual connecting portions 15D plays a role as radially inward regions exposed to the intake passages 8 to form a first condenser section. The heat pipes 14B have radially outward regions to form a second condenser section in the same manner as discussed with reference to the first embodiment shown in FIG. 1. An insulation sheet may be preferably disposed between the heat pipe 15B and the positive-side radiating fin 52B.

Modified Form

While the first embodiment has been described with reference to a structure wherein the heating means is comprised of the plurality of radiated discrete heat pipes 14, the discrete heat pipes 14 may be replaced with a single elongated heat pipe that is bent. In this case, the elongated heat pipe may be formed in a structure so as to include a plurality of radially extending portions and a plurality of circumferentially extending portions that are alternately combined with the plurality of radially extending portions in a way to cope with a pattern of the heat pipes 14 of the first embodiment shown in FIG. 1. In addition, it will be appreciated that a variety of known heat pipe technology can be applied to the heat pipes 14 set forth above.

While the specific embodiments of the present invention have been described in detail, it will be appreciated by those skilled in the art that various modifications and alternatives to those details could be developed in light of the overall teachings of the disclosure. Accordingly, the particular arrangements disclosed are meant to be illustrative only and not limited to the scope of the present invention, which is to be given the full breadth of the following claims and all equivalents thereof.

What is claimed is:

1. A vehicular electric rotary machine, comprising:
   a frame having a rear end wall formed with an intake passage and a circumferential wall formed with an exhaust passage;
   a stator fixedly supported by the frame and having a stator winding adapted to generate an alternating current voltage;
   a rotor rotatably supported inside the stator;
   a cooling fan fixedly secured to the rotor for drawing a cooling wind through the intake passage to an inside of the frame from which the cooling wind is exhausted to an outside through the exhaust passage;
   a cooling fin disposed on the rear end wall of the frame;
   a rectifier mounted on the cooling fin for rectifying the alternating current voltage; and
   rectifier cooling heat pipe means including an evaporator section held in close contact with the cooling fin and a condenser section extending to at least one of the intake passage and the exhaust passage to be exposed thereto;
   wherein the rectifier cooling heat pipe means includes a radially outward region extending along an outer surface of the frame for exposure to the exhaust passage to be cooled by the cooling wind being exhausted from the exhaust passage to the outside.

2. The vehicular electric rotary machine according to claim 1, wherein:
   the condenser section of the rectifier cooling heat pipe means is disposed in the exhaust passage so as to cross the cooling wind.

3. The vehicular electric rotary machine according to claim 1, wherein:
   the rear end wall of the frame has a plurality of heat pipe receiving recesses extending in a substantially radial direction, and the heat pipe means comprises a plurality of heat pipes forced into the heat pipe receiving recesses, respectively, to be integrally fixed to the frame.

4. The vehicular electric rotary machine according to claim 1, wherein:
   the rectifier cooling heat pipe means includes a region exposed to the intake passage to be cooled by the cooling wind drawn from the intake passage to the inside of the frame.

5. The vehicular electric rotary machine according to claim 4, wherein:
   the condenser section of the rectifier cooling heat pipe means is disposed in an area close proximity to the intake passage so as to cross the cooling wind.

6. The vehicular electric rotary machine according to claim 1, wherein:
   the rectifier cooling heat pipe means includes a planar surface portion in close contact with the cooling fin.

7. The vehicular electric rotary machine according to claim 6, wherein:
   the evaporator section of the rectifier cooling heat pipe means includes a tube, through which a coolant fluid flows, and which has a heat conducting surface held in close contact with a flat surface of the cooling fin.

8. The vehicular electric rotary machine according to claim 1, wherein the rectifier cooling heat pipe means comprises first and second pluralities of heat pipes held in contact with the rear end wall of the frame and the cooling fin, one of the first and second pluralities of heat pipes including radially inward regions extending across the intake passage to form the condenser section.

9. A vehicular electric rotary machine, comprising:
a frame having a rear end wall formed with an intake passage and a circumferential wall formed with an exhaust passage;
a stator fixedly supported by the frame and having a stator winding adapted to generate an alternating current voltage;
a rotor rotatably supported inside the stator;
a cooling fan fixedly secured to the rotor for drawing a cooling wind through the intake passage to an inside of the frame from which the cooling wind is exhausted to an outside through the exhaust passage;
a cooling fin disposed on the rear end wall of the frame;
a rectifier mounted on the cooling fin for rectifying the alternating current voltage; and
rectifier cooling heat pipe means including an evaporator section held in close contact with the cooling fin and a condenser section extending to at least one of the intake passage and the exhaust passage to be exposed thereto;
wherein the rectifier cooling heat pipe means comprises a plurality of heat pipes each including a radially inward region exposed to the intake passage, an intermediate region held in contact with the cooling fin, and a radially outward region extending along an outer surface of the frame for exposure to the exhaust passage to be cooled by the cooling wind being exhausted from the exhaust passage.

10. A vehicular electric rotary machine, comprising:
a frame having a rear end wall formed with an intake passage and a circumferential wall formed with an exhaust passage;
a stator fixedly supported by the frame and having a stator winding adapted to generate an alternating current voltage;
a rotor rotatably supported inside the stator;
a cooling fan fixedly secured to the rotor for drawing a cooling wind through the intake passage to an inside of the frame from which the cooling wind is exhausted to an outside through the exhaust passage;
a cooling fin disposed on the rear end wall of the frame;
a rectifier mounted on the cooling fin for rectifying the alternating current voltage; and
rectifier cooling heat pipe means including an evaporator section held in close contact with the cooling fin and a condenser section extending to at least one of the intake passage and the exhaust passage to be exposed thereto;
wherein the cooling fins comprises first and second heat radiating fins mounted on the rear end wall of the frame; and
wherein the rectifier cooling heat pipe means comprises a first plurality of heat pipes held in close contact with the rear end wall of the frame and the first heat radiating fins, and a second plurality of heat pipes held in close contact with the second heat radiating fins, the first and second pluralities of heat pipes including radially inward regions exposed to the intake passage so as to cross the cooling wind.

11. The vehicular electric rotary machine according to claim 10, wherein:
the rear end wall of the frame has a first plurality of heat pipe receiving recesses to which the first pluralities of heat pipes are press fitted, respectively; and
the second heat radiating fin has a second plurality of heat pipe receiving recesses to which the second plurality of heat pipes are press fitted, respectively.

12. The vehicular electric rotary machine according to claim 10, wherein:
the first heat radiating fin has a first plurality of heat pipe receiving recesses to which the first plurality of heat pipes are press fitted, respectively; and
the second heat radiating fin has a second plurality of heat pipe receiving recesses to which the second plurality of heat pipes are press fitted, respectively.

13. The vehicular electric rotary machine according to claim 11, wherein:
the first and second pluralities of heat pipes are integrally connected to each other via radially inward regions exposed to the intake passage to form the condenser section.

14. The vehicular electric rotary machine according to claim 12, wherein the first and second pluralities of heat pipes are integrally connected to each other via radially inward regions exposed to the intake passage to form the condenser section.

* * * * *